United States Patent Office 3,094,541
Patented June 18, 1963

3,094,541
3-SUBSTITUTED ETHERS OF THE ANDROSTANE SERIES
Edward W. Cantrall, Pearl River, N.Y., Ruddy Littell, Rivervale, N.J., and Seymour Bernstein, New City, and Samuel Gordon, Pearl River, N.Y., assignors to American Cyanamid Company, Stamford, Conn., a corporation of Maine
No Drawing. Filed Nov. 6, 1962, Ser. No. 235,833
9 Claims. (Cl. 260—397.5)

This invention relates to new steroid compounds. More particularly, it relates to 3-substituted ethers of the androstane series and methods of preparing the same.

The novel steroids can be illustrated by the following formula:

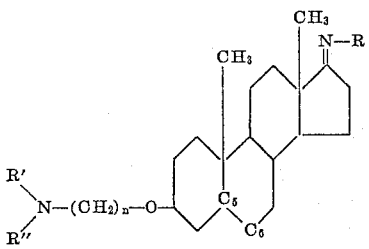

wherein R is a lower alkyl or an ω-hydroxy lower alkyl radical, R' and R" are lower alkyl radicals, $>C_5$—$C_6$— is a $>C$=$CH$— or $>CH$—$CH_2$— radical and $n$ is an integer from 2 to 4.

Furthermore, the invention embodies the mineral acid salts of the above defined products, particularly the hydrochlorides and sulfates.

The above compounds are crystalline. The free bases are generally insoluble in water and somewhat soluble in the usual organic solvents such as chloroform or petroleum ether whereas the mineral acid salts are soluble in water.

The compounds of the present invention are, in general, prepared by reacting a compound of the formula:

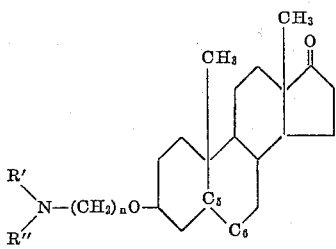

wherein R', R", $>C_5$—$C_6$— and $n$ are as defined heretofore, with a primary lower alkylamine or ω-hydroxy lower alkylamine. The reaction is preferably carried out in a solvent inert to the reactants at an elevated temperature. However, when the amine is a liquid, an excess may be used as a solvent.

Typical steroids prepared by the process of the present invention include:

3β-(β-dimethylaminoethoxy)-17-methylimino-androst-5-en;
3β-(γ-dimethylaminopropyloxy)-17-methylimino-androst-5-ene;
3β-(δ-dimethylaminobutyloxy)-17-methylimino-androst-5-ene;
3β-(β-dimethylaminoethoxy)-17-methylimino-androstane;
3β-(β-diethylaminoethoxy)-17-(β-hydroxyethylimino)-androst-5-ene;
3β-(γ-dipropylaminoethoxy)-17-(β-hydroxyethylimino)-androst-5-ene;
3β-(β-dimethylaminoethoxy)-17-ethylimino-androstane;
3β-(β-dimethylaminoethoxy)-17-propylimino-androstane;
3β-(β-dimethylaminoethoxy)-17-butylimino-androst-5-ene;
3β-(β-dimethylaminoethoxy)-17-(β-hydroxyethylimino)-androst-5-ene and the like. Treatment of these compounds with mineral acid produces the 3-aminoether salt. Methods of preparing these compounds are described hereinafter in the examples.

The steroid compounds of this invention have shown anticholesteremic activity approximately equal to that of [p - (β-diethylaminoethoxy)phenyl]-1-(p-tolyl)-2-(p-chlorophenyl)ethanol which has been used commercially. They are, therefore, useful in the treatment of hypercholesteremia.

The steroids described above may be dispensed as the active ingredient in compositions of the steroid and an edible carrier. While the amount of steroid to be given daily will depend on many factors such as size, weight, age, etc., of the warm blooded animal, it has been found that a daily intake of from 50 mg. to 250 mg. will produce good results. The dosage unit may be in a form for a single unit per day, or smaller forms for use as multiple units per day. In the case of tablets, they may be of larger size, scored for use as fractional units one or more times per day.

The compositions can be dispensed in the form of soft or hard shell gelatin capsules. Also present in the capsules may be diluents such as lactose, starch, magnesium oxide, magnesium stearate and the like. The capsules may be large enough to provide the desirable daily dosage or smaller to be used in multiple doses per day.

The present compositions may be dispensed as parenteral solutions or suspensions. If larger doses in small amounts are desirable it may be necessary to use parenteral suspensions because the solubility of the steroids in substantially aqueous solutions is limited.

The compositions of the present invention may take the form of syrups or pediatric drops. Such formulations usually contain one or more of the following suspending agents, buffer salts, stabilizers, preservatives, etc.

The following examples describe the compounds of the present invention.

EXAMPLE 1

*Preparation of 3β-(β-Dimethylaminoethoxy)-5-Androsten-17-One*

To a solution containing 50.0 g. of 17-ethylenedioxy-5-androsten-3β-ol in 1.5 liters of tetrahydrofuran (freshly distilled from calcium hydride) is added 21.1 g. of potassium t-butoxide and the resulting mixture is heated to reflux under nitrogen for one hour. Dimethylaminoethylchloride (87 ml.) is added dropwise to the reaction mixture at reflux with stirring under nitrogen over 2 hours. Reflux is continued another hour, following which 21.1 g. of potassium t-butoxide dissolved in 100 ml. of tetrahydrofuran is added. The resulting mixture is heated at reflux for 3 hours, filtered and evaporated to a viscous oil. The latter is partitioned between ether and water, and the ether phase is washed with saturated sodium chloride solution and dried over anhydrous sodium sulfate. The dried solution is treated with gaseous hydrochloric acid. The hydrochloride is filtered, washed with ether and partitioned between 500 ml. of ether and 2.5 liters of 3% hydrochloric acid. The aqueous phase is made alkaline with cold 30% potassium hydroxide and the product is extracted into ether. The ether extract is washed with water and dried over anhydrous sodium sulfate. Upon evaporation, the dried extract gives 28.8 g. of a semi-crystalline solid which is crystallized from aqueous acetone to give 16.7 g. of needles, melting point 120.5–122.5° C. Further recrystallization gives the product as needles, melting point 123.5–124° C.

EXAMPLE 2

*Preparation of 3β-(β-Dimethylaminoethoxy)-17-Methyl-Imino-Androst-5-Ene*

To a solution of 2.0 g. of 3β-(β-dimethylaminoethoxy)-androst-5-en-17-one- in 20 ml. of ethyl alcohol is added 30 ml. of 40% aqueous methylamine and the solution is heated at reflux for 45 minutes. Upon cooling, water is added and the resulting oil is extracted into ethyl acetate. The organic extract is washed three times with saturated saline, dried and evaporated to a white powder. Two crystallizations from acetone gives 830 mg. of pure 17-methylimine, melting point 104–105° C., $[\alpha]_D^{25}$—29° (chloroform).

In the above example when 3β-(β-diethylaminoethoxy)androst-5-en-17-one is substituted for 3β-(β-dimethylaminoethoxy)-androst-5-en-17-one the product obtained is 3β - (β-diethylaminoethoxy)-17-methyl-imino-androst-5-ene.

Also in the above example when 3β-(γ-diethylaminopropoxy)-androst-5-en-17-one or 3β - (δ-diethylaminobutoxy)-androst-5-en-17-one is substituted for 3β-(β-dimethylaminoethoxy)-androst-5-en-17-one the products obtained are 3β - (γ-diethylaminopropoxy)-17-methyl-imino-androst-5-ene and 3β-(δ-diethylaminobutoxy)-17-methylimino-androst-5-ene, respectively.

EXAMPLE 3

*Preparation of 3β-(β-Dimethylaminoethoxy)-17-(β-Hydroxy-Ethylimino)-Androst-5-Ene*

A solution of 1.0 g. of 3β-(β-dimethylaminoethoxy)-androst-5-en-17-one in 10 ml. of 2-aminoethanol is heated at 80° C. for thirty minutes. The reaction mixture upon cooling forms a gel which is dissolved in benzene-ethyl acetate (1:1). The solution is washed with saturated sodium chloride solution, dried and evaporated. The residue is crystallized from acetone to give 390 mg., melting point 135–137° C., $[\alpha]_D$—24°.

EXAMPLE 4

*Preparation of 3β-(β-Diethylaminoethoxy)-17-Methyl-Imino-Androstane*

Following the procedure of Example 2 and substituting 3β-(β-diethylaminoethoxy)-androstan-17-one for 3β-(β-dimethylaminoethoxy)-androst-5-en-17-one the product of the example is obtained.

EXAMPLE 5

*Preparation of 3β-(β-Dimethylaminoethoxy)-17-Butyl-imino-Androst-5-Ene*

Using the procedure of Example 2 and substituting n-butylamine for methylamine the product indicated is obtained.

EXAMPLE 6

*Preparation of 3β-(β-Dimethylaminoethoxy)-17-Methyl-imino-Androst-5-Ene Hydrochloride*

A solution of 3β-(β-dimethylaminoethoxy)-17-methyl-imino-androst-5-ene in chloroform is treated with hydrogen chloride to give the product of the example.

We claim:

1. A steroid of the formula:

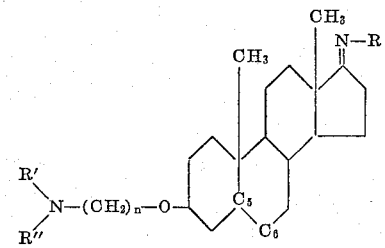

wherein R is selected from the group consisting of lower alkyl and omega-hydroxy lower alkyl radicals, R' and R'' are lower alkyl radicals, >C₅—C₆— is selected from the group consisting of >CH=CH— and >CH—CH₂— radicals and n is an integer from 2 to 4.

2. The compound of 3β-(β-dimethylaminoethoxy)-17-Methylimino-androst-5-ene.

3. The compound 3β-(β-dimethylaminoethoxy)-17-(β-hydroxyethylimino)-androst-5-ene.

4. The compound 3β-(β-diethylaminoethoxy)-17-methylimino-androst-5-ene.

5. The compound 3β-(γ-diethylaminopropoxy)-17-methylimino-androst-5-ene.

6. The compound 3β-(δ-diethylaminobutoxy)-17-methylimino-androst-5-ene.

7. The compound 3β-(β-diethylaminoethoxy)-17-methylimino-androstane.

8. The compound 3β-(β-dimethylaminoethoxy)-17-butylimino-androst-5-ene.

9. The compound 3β-(β-dimethylaminoethoxy)-17-methylimino-androst-5-ene hydrochloride.

No references cited.